June 9, 1936.  C. H. HAVILL  2,043,618

BALANCING MACHINE

Filed Jan. 16, 1932

INVENTOR
Clinton H. Havill
BY
Martin J. Finnegan
ATTORNEY.

Patented June 9, 1936

2,043,618

UNITED STATES PATENT OFFICE 2,043,618

BALANCING MACHINE

Clinton H. Havill, South Orange, N. J., assignor, by mesne assignments, to Eclipse Aviation Corporation, East Orange, N. J., a corporation of New Jersey Application January 16, 1932, Serial No. 587,137

2 Claims. (Cl. 73—51)

This invention relates to balancing machines and more particularly to means for supporting and testing a rotatable body for the purpose of placing said body in both static and dynamic balance.

An object of the invention is to provide a novel method and apparatus for supporting and driving a body to be balanced so that balancing may be effected with an economy in both time and effort expended.

In the rotation of engine and motor parts, such as crankshafts of internal combustion engines and the rotors of dynamo electric machines, imperceptible inaccuracies in either static balancing or dynamic balancing are so magnified by the centrifugal action as to cause serious disturbances in the running balance. In certain types of apparatus heretofore employed for the purpose of detecting and correcting such inaccuracies, means have been provided for driving the armature or crankshaft, or other device to be balanced, from an external prime mover having driving connection therewith, which driving connection included a clutch element by means of which the drive could be disconnected when the part to be balanced had acquired a speed somewhat above its normal operating speed, the said part to be balanced being then allowed to decelerate through its range of normal operating speeds, and balancing observations taken during this period of deceleration.

Considerable difficulty has been encountered in securing a satisfactory type of drive for this purpose, particularly because of the necessity of retarding the rotating body as quickly as possible, which of course necessitates the provision of clutch means of such a nature as to permit ready connection and disconnection of the body with respect to the actuating means. In some cases magnetic clutches have been resorted to, but these have not been entirely satisfactory because of residual magnetism and other inherent deficiencies of such a clutch for such a service.

It is accordingly proposed to employ a novel driving mechanism constituted by a rotatable friction element directly driven from an external source of power and movable from its normally disengaged position into frictional contact with the body to be tested, such movement being accomplished through manually operable linkage acting to displace the axis of rotation of said friction element by transverse movement thereof in a plane perpendicular to said axis; and the provision of such a releasable driving connection is accordingly one of the objects of the present invention.

Another method heretofore employed for indicating the location of the unbalanced mass on the body to be tested, has been to place an illuminating device, such as a neon tube, in a position to throw a beam of light on the surface of the rotating body, the theory being that by interposing in the circuit to the neon tube or other illuminating device, a vibrating circuit-interrupting element, the frequency of vibration of which is synchronous with the vibration of the rotating body, the light will be synchronized with the speed of the rotating body so as to illuminate only that portion of the surface at which the unbalanced mass is located. This method is sound in theory, but until the present invention no practical means have been known for insuring proper synchronization between the period of vibration of the circuit interrupter and the natural period of the body to be tested.

As a result of a course of experimentation which has culminated in the invention herein disclosed, it has been discovered that in order to obtain such synchronization, means must be provided for supporting a body to be rotated in such a manner that the period of vibration thereof can be made to synchronize with the natural period of the body to be rotated. By providing resilient bearing means, and mounting a circuit interrupting device thereon, and in the path of an externally rigidly mounted cooperating contact element, and by placing said elements in circuit with current intensifying means controlling the energization of the illuminating device, it is possible to obtain an accurate indication of the location of the unbalanced mass.

It is accordingly an object of the present invention to provide novel resilient means for mounting a body to be balanced, in combination with novel means for electrically controlling a device for illuminating the unbalanced sector of said body.

It is a further object of the invention to provide novel electrically energized illuminating means of the foregoing nature characterized by the provision of current intensifying means so disposed and controlled as to cause the illuminating device to flash upon the interruption of the circuit containing the vibrating contact element, there being no perceptible illumination of the device while the contact element is in circuit closing position.

Another object of the invention is to provide in a balancing machine of the foregoing character, novel means for maintaining synchronized relationship between the interruption of the light controlling the circuit and the vibrations of the body to be balanced.

These and other objects and advantages to be derived from the use of the invention herein disclosed will become evident from a study of the following description, when read with reference to the accompanying drawing illustrating one embodiment of the invention.

Figure 1:
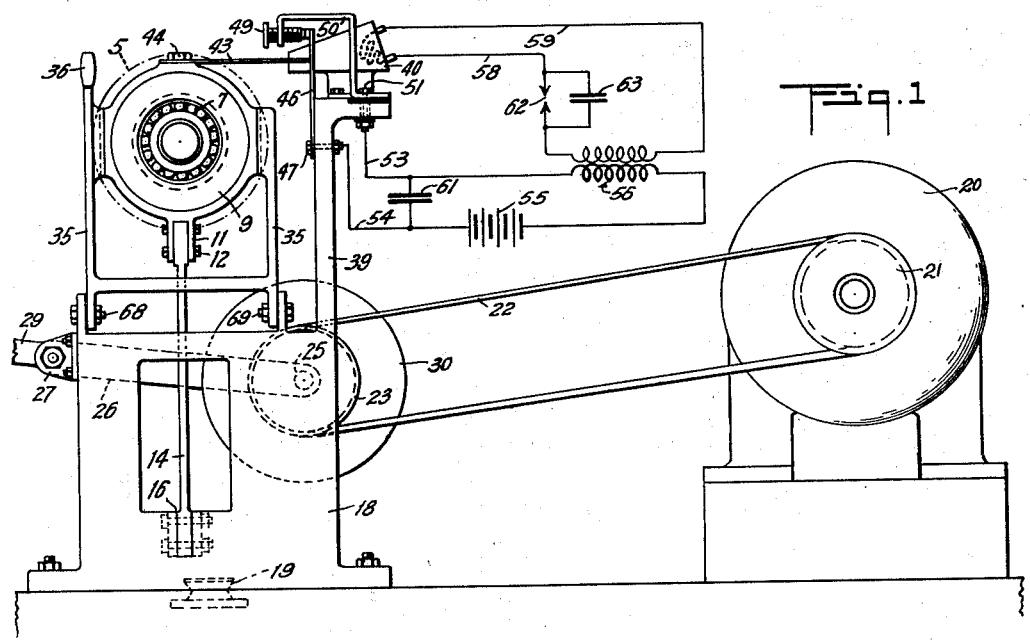
Fig. 1 is a view in elevation of a device embodying the invention, portions of the electrical apparatus being shown schematically.
Figures 2, 3:
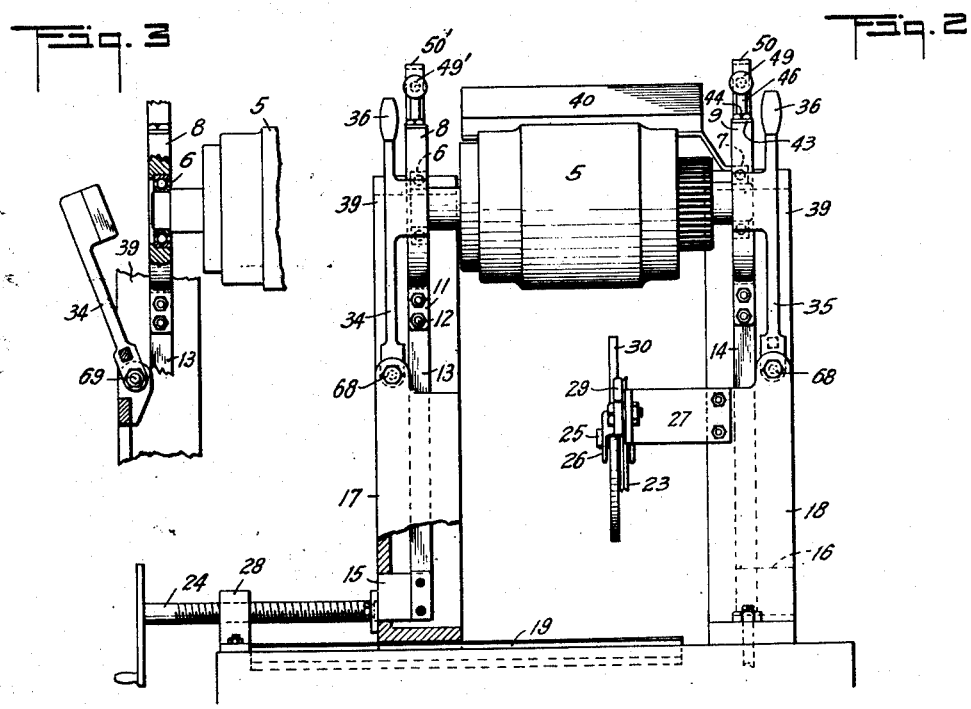
Fig. 2 is another view in elevation, taken at right angles to the viewpoint of Fig. 1.
Fig. 3 is a fragmental axial section of the supporting members.

Referring to the drawing, the embodiment therein shown includes a body 5 to be balanced, the body being shown for the purpose of illustration in the form of an armature of a conventional type of dynamo electric machine. The armature 5 is shown mounted in ball bearing assemblies 6 and 7, said bearings being received in brackets or yokes 8 and 9, respectively, said brackets being provided with depending portions 11 affording attachment thereof by suitable means 12 to a pair of vertically disposed supporting members 13 and 14 constructed of resilient material having the required strength, such as properly tempered steel, and anchored at their lower ends in suitable openings 15 and 16, respectively, in the rigid frames 17 and 18, the latter being provided with a flange for attachment to a supporting base or floor, and the former being slidable along a track 19 in response to rotation of a locating screw 24 threading through a stationary stanchion 28.

The means for rotating the armature 5, and for suddenly releasing the rotating means from operative connection therewith, comprises a prime mover 20 of suitable size, and a pulley or sheave 21 around which is passed a belt or equivalent driving connection 22 engageable with a second sheave or pulley 23 rotatable about a shaft 25 journaled on the end of a lever 26, the latter being pivoted to a bracket 27 on the frame 18, and having a projecting handle 29 for manual actuation to bring the friction wheel 30 into contact with the surface of the armature 5.

Normally the ball bearing yokes 8 and 9 are held against oscillation, by virtue of the engagement therewith of the vertically disposed standards 34 and 35, such standards being hinged as shown at 68 and 69, so as to be shiftable out of supporting relation to the yokes 8 and 9 by means of suitable handles 36. Extending upwardly from the frame 18 is a post 39 integral therewith, as shown, and supporting at its upper end an illuminating device 40 preferably consisting of a neon discharge tube and a suitable reflector for directing a relatively intense beam of light upon the surface of the rotor 5 at an angle bearing the calculated relation to the plane of unbalance of the rotor.

The novel means for causing the periodic energization of the neon lamp 40 to indicate the unbalanced sector on the surface of the rotor 5 as the latter rotates at high speed on the vibratory supports 13 and 14, comprises an arm 43 secured to the yoke 9 as indicated at 44, and engageable with a resilient current conducting finger 46 secured at one end to the post 39 as indicated at 47, and normally flexed so as to maintain itself in firm engagement with a cooperating contact element 49 adjustably held in a bracket 50 secured to the upper edge of post 39, as indicated at 51. The connections 47 and 51 (the latter being insulated from the post 39), also serve as terminals for conductors 54 and 53, respectively, of a primary circuit fed from a battery 55 and including one winding of a high tension induction coil 56, the secondary winding of which is connected by means of conductors 58 and 59 with the anode and cathode, respectively, of the neon tube 40. A condenser 61 is preferably inserted across the conductors 53 and 54 in order to reduce sparking to a minimum, while a spark gap 62 is provided between the induction coil and the neon tube, and in shunt with a condenser 63; the spark gap 62 being adjusted so that the neon light flashes perceptibly only when the finger 46 is moved out of contact with the element 49 by the action of the interrupting arm 43.

In operation, the body to be balanced is placed in the yokes 8 and 9, the frame member 17 being withdrawn along track 19 to permit such insertion. The frame is then returned to supporting relation to the yoke 8, the prime mover 20 energized and the handle 29 actuated to bring the friction wheel 30 into engagement with the surface of the rotor 5. When the rotor is accelerated to a speed somewhat above the normal speed at which the rotor is expected to run in its intended service, the prime mover 20 is de-energized and the friction wheel 30 disengaged from the rotor, the latter continuing to rotate due to its momentum. The handles 36 are now actuated to release the rigid supports 34 and 35, thus permitting the bearings 6 and 7 to vibrate on the springs 13 and 14, respectively. As the bearings vibrate, due to lack of balance either statically or dynamically, the arm 43 is correspondingly reciprocated to cause alternate opening and closing of the primary circuit from the source 55; each opening of the circuit creating an intense illumination of the neon tube 40 due to the induction action produced by the windings of the induction coil 56. These periods of intense illumination of the lamp 40 being synchronized with the vibratory period of the rotor 5, the result will be to illuminate a certain longitudinal segment on the surface of the rotor upon each revolution thereof, this plane coinciding with or bearing a predetermined angular relation to the place on the rotor where the unbalanced mass is located. Any of the ordinary methods may be employed for identifying this segment, as, for example, the placing of a series of reference characters about the periphery of the rotor.

There is thus disclosed a novel method of and apparatus for indicating the location of the unbalanced portion of a rotatable body, the invention being incorporated in a device which is extremely simple and inexpensive, yet which insures determination of the unbalanced condition with sufficient accuracy for all practical purposes, and without the necessity of any elaborate adjustments or prolonged observation. Moreover, if desired, readings can be taken on both ends of the rotor by duplicating the electrical parts, as indicated in part at 49′ and 50′. The dynamic couples of unbalance may thus be determined.

It is to be understood that various other changes may be made in the form, details of construction, arrangement of the parts and the uses to which they are applied without departing from the invention as defined in the appended claims.

What is claimed is:

1. In a device of the class described, in combination, bearing means for the body to be balanced, a plurality of vertically disposed standards the upper sections of which are hinged to the lower sections thereof for releasably engaging said bearing means, and resilient means supporting said bearing means whereby the body to be balanced may vibrate freely, but only when said upper sections are disengaged from said bearing means.

2. In a device of the class described, in combination, bearing means for the body to be balanced, a plurality of vertically disposed standards the upper sections of which are hinged to the lower sections thereof for releasable engagement with said bearing means, resilient means for yieldably supporting said bearing means, said upper sections being releasable while said body is rotating to transfer the stress reactions to said resilient means.

CLINTON H. HAVILL.